(12) United States Patent
Sundaresan

(10) Patent No.: US 9,735,945 B2
(45) Date of Patent: Aug. 15, 2017

(54) RESOURCE MANAGEMENT WITH DEVICE-DEVICE COMMUNICATION IN NEXT GENERATION CELLULAR NETWORKS

(71) Applicant: NEC Laboratories America, Inc., Princeton, NJ (US)

(72) Inventor: Karthikeyan Sundaresan, Howell, NJ (US)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 14/340,263

(22) Filed: Jul. 24, 2014

(65) Prior Publication Data

US 2015/0029908 A1    Jan. 29, 2015

Related U.S. Application Data

(60) Provisional application No. 61/859,169, filed on Jul. 26, 2013.

(51) Int. Cl.
*H04L 5/00* (2006.01)
*H04W 16/10* (2009.01)

(52) U.S. Cl.
CPC .......... *H04L 5/0073* (2013.01); *H04W 16/10* (2013.01)

(58) Field of Classification Search
None
See application file for complete search history.

(56) References Cited

U.S. PATENT DOCUMENTS

| | | | | |
|---|---|---|---|---|
| 2007/0280175 A1* | 12/2007 | Cheng | .................... | H04B 7/022 370/338 |
| 2009/0238251 A1* | 9/2009 | Rofougaran | ...... | H04L 12/40013 375/219 |
| 2010/0110996 A1* | 5/2010 | Tao | ........................ | H04W 16/02 370/329 |
| 2010/0197314 A1* | 8/2010 | Maaref | ................. | H04W 16/04 455/450 |
| 2011/0222496 A1* | 9/2011 | Zhou | .................... | H04L 5/0037 370/329 |
| 2012/0082050 A1* | 4/2012 | Lysejko | .............. | H04W 72/082 370/252 |
| 2012/0094702 A1* | 4/2012 | Furueda | ................ | H04W 72/02 455/501 |
| 2012/0327865 A1* | 12/2012 | Hottinen | ............... | H04W 72/02 370/329 |
| 2013/0003591 A1* | 1/2013 | Novak | .................. | H04W 36/06 370/252 |
| 2014/0141789 A1* | 5/2014 | Tarokh | .................. | H04W 72/02 455/450 |

(Continued)

*Primary Examiner* — Donald Mills
(74) *Attorney, Agent, or Firm* — Joseph Kolodka

(57) ABSTRACT

At the beginning of every epoch the invention estimates the average traffic demand from cellular and device-to-device traffic in each sector in either DL or UL directions based on history from previous epochs. It partitions the network into interfering sectors and employing device-to-device traffic to determine the dynamic fractional frequency reuse FFR patterns for each of these clusters. Then, in every frame, for the set of sectors co-located at the same base station and instantaneous traffic demands, the invention solves the problem of device-to-device traffic placement and scheduling of cellular and device-to-device traffic jointly.

8 Claims, 3 Drawing Sheets

(56) References Cited

U.S. PATENT DOCUMENTS

| | | | |
|---|---|---|---|
| 2014/0269492 A1* | 9/2014 | Forenza | H04B 7/0626 370/328 |
| 2014/0302859 A1* | 10/2014 | Nama | H04W 16/10 455/447 |
| 2015/0131537 A1* | 5/2015 | Chiang | H04L 5/0057 370/329 |
| 2016/0081046 A1* | 3/2016 | Li | H04W 72/082 370/328 |

* cited by examiner

RESOURCE MANAGEMENT WITH DEVICE-DEVICE COMMUNICATION IN NEXT GENERATION CELLULAR NETWORKS

RELATED APPLICATION INFORMATION

This application claims priority to provisional application No. 61/859,169 filed Jul. 26, 2013, entitled "System and method for resource management with device-device communication in next generation cellular networks", the contents thereof are incorporated herein by reference

BACKGROUND OF THE INVENTION

The present invention relates generally to communications in cellular networks, and more particularly, to resource management with device-device communication in next generation cellular networks.

Device-to-device (D2D) communications is being pursued as an important feature in next generation wireless networks (LTE-direct, WiFi-direct). Being an underlay to conventional infrastructure wireless networks, the goal of D2D is to leverage the physical proximity of communicating devices to improve wireless coverage in sparse deployments, provide connectivity for public safety services and improve resource utilization in conventional deployments. However. D2D's ability to improve resource utilization has not been well addressed and there are no solutions for managing wireless spectral resources efficiently between conventional users (users communicating with base stations) and D2D users (users communicating amongst themselves), and also for leveraging the offloading capability of D2D communications.

Current solutions for D2D do not account for multi-cell, sectored nature of wireless cellular networks and hence have not considered D2D in the presence of conventional FFR (fractional frequency solutions) solutions that are typically considered for resource management in cellular networks. Also, they assume a lot of channel state information between client devices in addition to that with respect to the base stations, thereby posing a scalability issue.

Accordingly, there is a need for resource management with device-device communication in next generation cellular networks.

BRIEF SUMMARY OF THE INVENTION

The invention is directed to a method for providing resource management in cellular networks responsive to device-to-device communication capability in time division and frequency division duplexing wireless communication systems, the providing includes estimating, at the beginning of every epoch lasting several tens of frames, an average traffic or resource demand from cellular and device-to-device traffic in each sector of the network based on history from previous epochs, partitioning the network into disjoint small clusters of interfering sectors called cross sectors and utilizing device-to-device traffic to determine dynamic fractional frequency reuse patterns for downlink and uplink jointly for each of the clusters in a distributed and localized manner, and determining, responsive to the determined fractional frequency reuse patterns, resources of operation for each sector in the cluster in downlink and uplink directions.

In a similar aspect of the invention there is provided a non-transitory storage medium configured with instructions to be implemented by a computer for carrying out providing resource management in cellular networks responsive to device-to-device communication capability in time division and frequency division duplexing wireless communication systems, the providing comprising, estimating, at the beginning of every epoch lasting several tens of frames, an average traffic or resource demand from cellular and device-to-device traffic in each sector of the network based on history from previous epochs, partitioning the network into disjoint small clusters of interfering sectors called cross sectors and utilizing device-to-device traffic to determine dynamic fractional frequency reuse patterns for downlink and uplink jointly for each of the clusters in a distributed and localized manner, and determining, responsive to the determined fractional frequency reuse patterns, resources of operation for each sector in the cluster in downlink and uplink directions.

These and other advantages of the invention will be apparent to those of ordinary skill in the art by reference to the following detailed description and the accompanying drawings.

DETAILED DESCRIPTION

The present invention is directed to a radio resource management (RRM) with device-to-device (D2D) communication (R2D2) solution that provides for efficient, scalable resource management in cellular networks by leveraging D2D communication capability in both TDD (time division duplexing) and FDD (frequency division duplexing) systems. It operates at two time scales. At the beginning of every epoch (lasting several tens of frames), R2D2 estimates the average traffic (resource) demand from cellular and D2D traffic in each sector in either directions (downlink, DL and uplink, UL) based on history (from previous epochs). It partitions the network into disjoint (small) clusters of interfering sectors (called cross sectors) and leverages the flexible nature of D2D traffic to determine the dynamic FFR patterns for DL and UL jointly for each of these clusters in a completely distributed and localized manner. Based on the dynamic FFR pattern determined, the resources of operation are determined for each sector in the cluster in DL and UL directions. Then, in every frame, for the set of sectors co-located at the same base station and instantaneous traffic demands, R2D2 solves the coupled problem of D2D traffic placement and scheduling of cellular and D2D traffic jointly on both the DL and UL resources as well as across the sectors.

Figure 1:
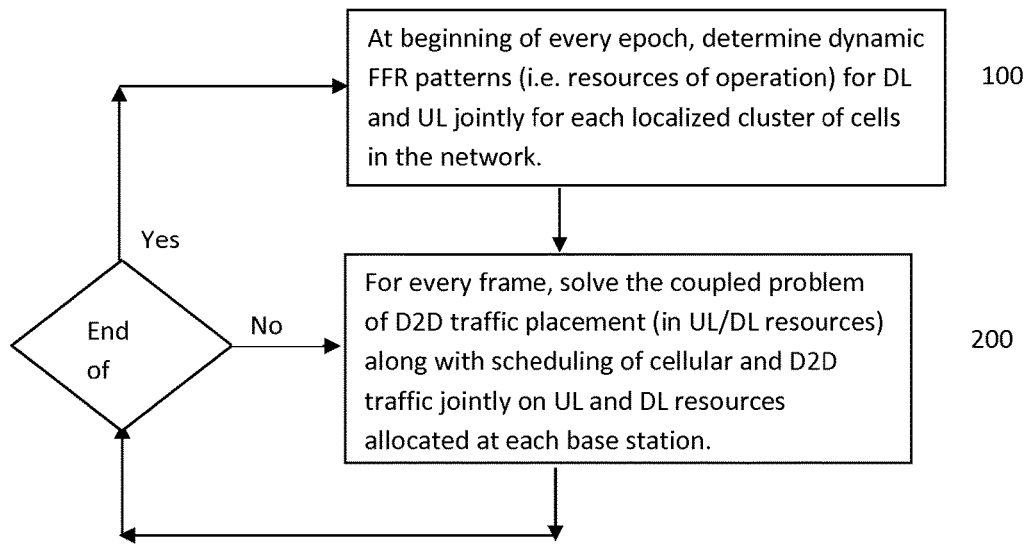
FIG. 1 is a diagram showing key steps of the inventive R2D2 method.

Referring now to FIG. 1, a high level diagram of the inventive R2D2 method is shown. Initially, at the beginning of every epoch, the method determines dynamic FFR patterns, i.e., resources of operation) for downlink DL and uplink jointly for each localized cluster of cells in the network 100. For very frame, the method solves the coupled problem of D2D placement in uplink UL and downlink DL resources, along with scheduling of cellular D2D traffic jointly on uplink and downlink resources allocated at each base station 200. If the problem in step 200 is solved, the method returns to the beginning of another epoch 100, if not the method returns back to solve the coupled problem 200.

Figure 2:
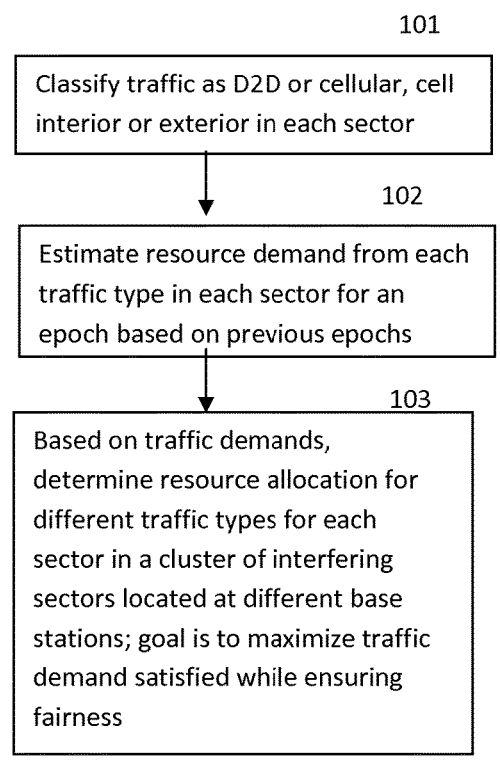
FIG. 2 is a diagram detailing step 100 of FIG. 1.

Step 100 is broken down into three distinct steps 101, 102, and 103 shown in the block diagram of FIG. 2. Initially, at step 101, the method classifies traffic as D2D or cellular, cell interior or exterior in each sector.

Sectors in R2D2 offload/classify a flow/session as D2D if both of the following conditions are satisfied: (i) Flow originates and ends in the same sector; and, (ii) Expected time to send one bit from the transmitter to receiver over D2D link is lower than that required to send it over the cellular links.

In the case of a cellular user, SINR thresholds are used to classify the user as a cell-interior or exterior user. For a D2D link, its classification has to be done taking into account the classifications of both the devices in the link. A D2D link as interior traffic only if both ends of the link are cell-interior users; otherwise the pair is classified as exterior traffic.

Then at step 102, the inventive R2D2 method estimates resource demand from each traffic type in each sector for an epoch based on previous epochs. R2D2 keeps track of the aggregate resource allocation (R, in resource blocks) to the interior and exterior traffic of both cellular and D2D users in each epoch (for every sector j) and computes the estimate for average resource demand (R') for the current epoch in sector j as a weighted moving average: $R'_{j,xyz}(t)=\alpha R_{j,xyz}(t-1)+(1-\alpha)R'_{j,xyz}(t-1)$. Here x={cellular,D2D} traffic; y={interior, exterior} traffic; and z={downlink, uplink} traffic in sector j. The above equation estimates the average resource demand for a given traffic type in a particular direction.

At step 103, based on traffic/resource demands, the method determines resource allocation for different traffic types for each sector in a cluster of interfering sectors located at different base stations. Here, the goal is to maximize traffic demand satisfied while ensuring fairness among allocations to the interfering sectors. One can employ various optimization techniques to determine these allocations. The key feature in this optimization is to leverage the flexibility of D2D traffic demands that can be satisfied by either the uplink or downlink resources available.

Three different solutions for TDD systems 2021, 2022, 2023 (*i,ii,iii*) and one solution for FDD system 2023(*iii*). The solution 2022 (*ii*) is lower in complexity compared to 2012 (*i*) and 2023 (*iii*); only 2023 (*iii*) applies to FDD and incorporates the additional constraint that a D2D user can be allocated resources either from the downlink or uplink pool of resources but not from both.

Figure 3:
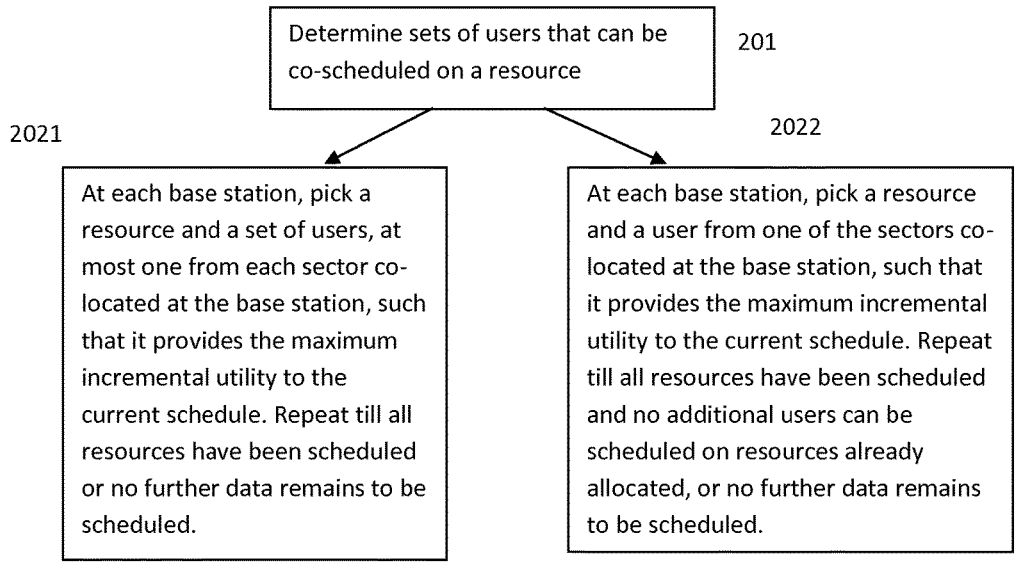
FIG. 3 is a diagram detailing step 200 of FIG. 1.
Figure 4:
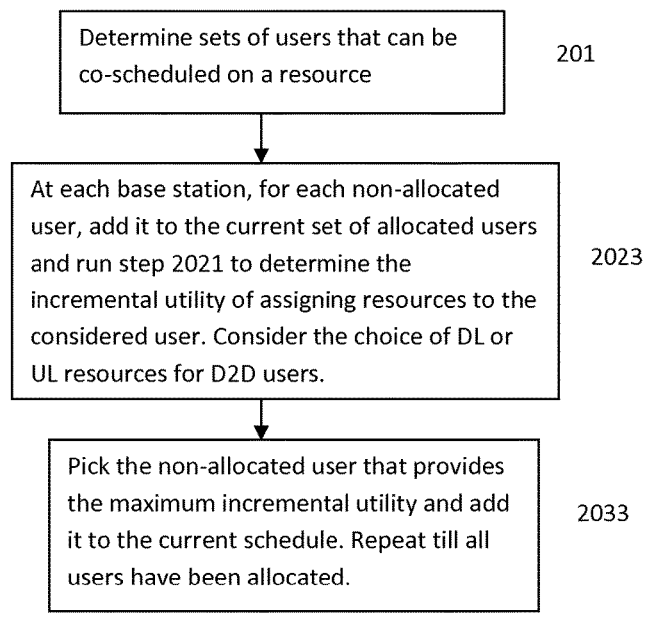
FIG. 4 is a diagram further detailing step 200 of FIG. 1.
Figure 5:
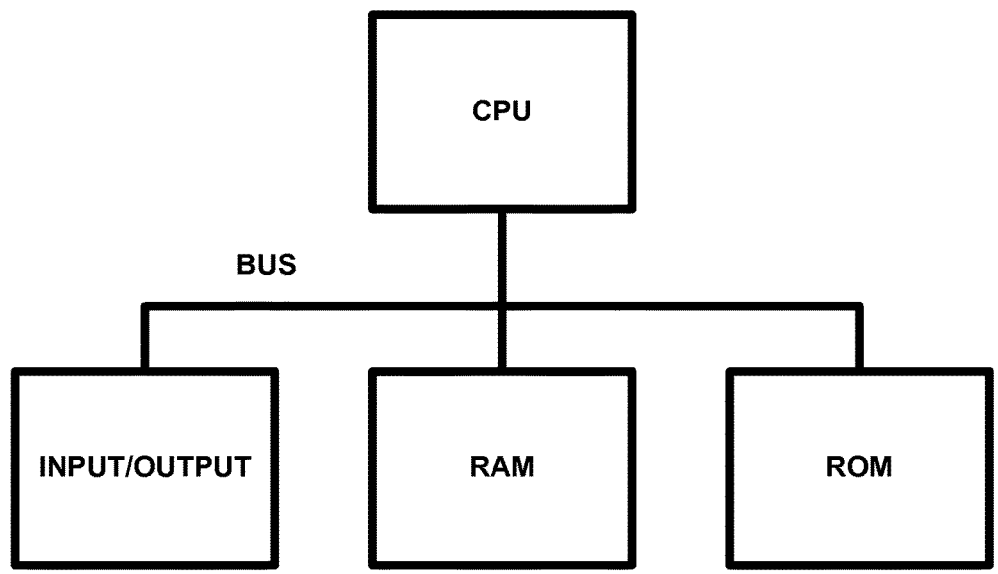
FIG. 5 shows an exemplary computer to perform the inventive R2D2 method.

FIG. 3 is a diagram for the inventive method solution in TDD systems. Step 201 includes two steps 2021 and 2022.

At step 201 the method determines sets of users that can be co-scheduled on a resource block (RB). Every user keeps track of the reference signal receiver power (RSRP) from its neighboring cells/sectors. Using RSRP, a user can determine which of its co-located sectors it is closer to, thereby localizing it to a particular half of its sector. Now to determine if a user can be co-scheduled on an RB with another user, the receiver of the first link and the transmitter (interferer) of the second link are considered. If both of them are located in opposite halves of sectors and are both not interior traffic, then they can be co-scheduled. Note that if either of the users in the consideration is a cellular BS, then there is no interference due to sectorization. When a user is co-scheduled with two other users, the same check can be employed with each of the interfering users independently.

At step 2021, the method, at each base station, picks a resource block and a set of users, at most one from each sector co-located at the base station, such that it provides the maximum incremental utility to the current schedule. This is repeated until all resource blocks have been scheduled or no further data remains to be scheduled. The utility function can be defined to capture the balance between throughput and fairness and can comprise of well-known utility functions such as logarithm functions that capture proportional fairness.

At step 2022, the method, at each base station, picks a resource and a user from one of the sectors co-located at the base station, such that it provides the maximum incremental utility to the current schedule. Repeat till all resources have been scheduled and no additional users can be scheduled on resource blocks already allocated, or no further data remains to be scheduled.

Following the determination of sets of users that can be co-scheduled, the R2D2 method includes steps 2023 and 2033.

At step 2023, in a TDD situation the method, at each base station, for each non-allocated user, adds that user to the current set of allocated users in the schedule and run the solution in step 2021 as a sub-module to determine the incremental utility of assigning resources to the considered user. The choice of DL or UL resources for D2D users is considered.

At step 2033, in a FDD situation, the method picks the non-allocated user that provides the maximum incremental utility and adds it to the current schedule. This is repeated until all users have been allocated.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

By way of example, a block diagram of a computer to support the system is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides a solution that is scalable in terms of processing and overhead, efficient in terms of performance (increased system capacity) and resource utilization, and low complexity to implement in real-time.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A wireless communication system operating as part of a larger network, said wireless communication system comprising:

base stations each having a non-transitory computer readable medium comprising computer readable instructions which when executed by a processor incorporated into each base station facilitate communications as device-to-device D2D or cellular with cellular being interior or exterior in each sector of the wireless communication system, the processor coupled to read only storage and random access storage resources and having inputs and outputs, the processor executing computer readable instructions to provide resource capability in time division and frequency division duplexing wireless communication systems, based on a history from previous epochs, the processor estimating at the beginning of every epoch an average traffic or resource demand from cellular and device-to-device traffic in each sector, said resource demand (R') for a current epoch in sector j being determined by the processor as a weighted moving average according to the following relationship:

$$R'_{j,xyz}(t) = \alpha R_{j,xyz}(t-1) + (1-\alpha) R'_{j,xyz}(t-1)$$

where x={CELLULAR, D2D} traffic; y={interior, exterior} traffic; and z={downlink, uplink} traffic in sector j;

the processor partitioning the network into disjoint small clusters of interfering sectors called cross sectors and utilizing device-to-device traffic to determine dynamic fractional frequency reuse patterns to downlink and uplink jointly for each of the clusters in a distributed and localized manner; and the base stations operating according to the determined fractional frequency reuse patterns for each sector in the cluster in downlink and uplink directions.

2. The wireless communication system of claim 1, wherein the processor comprises that in every frame, for the set of sectors co-located at a same base station and instantaneous traffic demands, solving a problem of device to device traffic placement and scheduling of cellular traffic jointly on both the downlink and uplink resources as well as across the sectors.

3. The wireless communication system of claim 1, wherein the processor comprises estimating an average traffic or resource demand from cellular and device-to-device traffic in each sector of the network in either downlink or uplink directions.

4. The wireless communication system of claim 1, wherein the processor comprises based on traffic demands determining resource allocation for different types of cellular traffic for each sector in a cluster of interfering sectors located at different base stations while maximizing traffic demand that is satisfied and ensuring resource allocation according to fairness guidelines.

5. The wireless communication system of claim 1, wherein the processor comprises determining sets of users that can be co-scheduled on a resource in the network which includes, at each base station, picking a resource and a set of users, at most one from each sector co-located at the base station, such that it provides the maximum incremental utility to the current schedule and repeating until all resources have been scheduled or not further data remains to be scheduled.

6. The wireless communication system of claim 1, wherein the processor comprises determining sets of users that can be co-scheduled on a resource in the network which includes, at each base station, picking a resource and a user from one of the sectors co-located at the base station, such that it provides the maximum incremental utility to the current schedule, and repeating until all resources have been scheduled and no additional users can be scheduled on resources already allocated, or no further data remains to be scheduled.

7. The wireless communication system of claim 1, wherein the processor comprises determining sets of users that can be co-scheduled on a resource in the network which includes, at each base station, for each non-allocated user, adding it to the current set of allocated users and determining an incremental utility of assigning resources to the considered user with a choice of downlink or uplink resources for device-to-device users being considered.

8. The wireless communication system of claim 1, wherein the processor comprises picking a non-allocated user that provides a maximum incremental utility and adding it to a current schedule and repeating until all users have been allocated.

* * * * *